United States Patent
Mukaiyama

(10) Patent No.: US 9,019,517 B2
(45) Date of Patent: Apr. 28, 2015

(54) IMAGE READING APPARATUS, IMAGE FORMING SYSTEM, AND METHOD FOR PERFORMING IMAGE AND TRANSPORT CALIBRATION

(71) Applicant: Seiko Epson Corporation, Tokyo (JP)

(72) Inventor: Kiyoshi Mukaiyama, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 40 days.

(21) Appl. No.: 13/747,929

(22) Filed: Jan. 23, 2013

(65) Prior Publication Data

US 2013/0188210 A1  Jul. 25, 2013

(30) Foreign Application Priority Data

Jan. 25, 2012  (JP) ................................. 2012-013102

(51) Int. Cl.
*G06F 3/12*  (2006.01)
*H04N 1/00*  (2006.01)
*G06K 15/00*  (2006.01)

(52) U.S. Cl.
CPC ....... *H04N 1/00015* (2013.01); *H04N 1/00013* (2013.01); *H04N 1/00031* (2013.01); *H04N 1/00045* (2013.01); *H04N 1/00053* (2013.01); *H04N 1/00063* (2013.01); *H04N 1/00087* (2013.01); *H04N 2201/0081* (2013.01); *H04N 2201/0091* (2013.01)

(58) Field of Classification Search
CPC .......... H04N 1/00015; H04N 1/00012; H04N 1/00031; H04N 1/00045; H04N 1/00063; H04N 1/00097; H04N 1/00053; H04N 13/0246; H04N 13/0425; H04N 2201/0448; H04N 2201/0091; H04N 2201/0081; G06F 3/0418; G06T 7/0018; G06T 7/002; G06T 7/0022; G06T 7/0024
USPC ......... 358/1.1, 1.9, 3.28, 1.15, 406, 504, 505, 358/518, 1.13
See application file for complete search history.

(56) References Cited

U.S. PATENT DOCUMENTS

| 6,802,580 B2* | 10/2004 | Valero ............................... 347/1 |
| 8,405,888 B2* | 3/2013 | Fukutome et al. ............. 358/488 |
| 8,646,900 B2* | 2/2014 | Kondo et al. ................. 347/102 |
| 2003/0098985 A1* | 5/2003 | Horobin ........................ 358/1.9 |
| 2007/0013964 A1* | 1/2007 | Ono .............................. 358/406 |
| 2010/0245944 A1* | 9/2010 | Fukutome et al. ............. 358/488 |
| 2012/0081450 A1* | 4/2012 | Nakano et al. .................. 347/19 |

FOREIGN PATENT DOCUMENTS

| JP | 2003-152965 A | 5/2003 |
| JP | 2008-042602 A | 2/2008 |
| JP | 2010-239236 A | 10/2010 |

\* cited by examiner

*Primary Examiner* — Gabriel Garcia
(74) *Attorney, Agent, or Firm* — Maschoff Brennan

(57) ABSTRACT

A printing medium on which a read and transport correction pattern whose longitudinal direction extends along the main scanning direction (the direction intersecting the forming and transporting direction) of a printer engine is set as a document M. The printing medium is transported such that the reading and transporting direction extends along the main scanning direction of the printer engine and is read, and read correction information for use in correcting a transport displacement of the document is set on the basis of a result of the reading.

20 Claims, 11 Drawing Sheets

FIG. 1
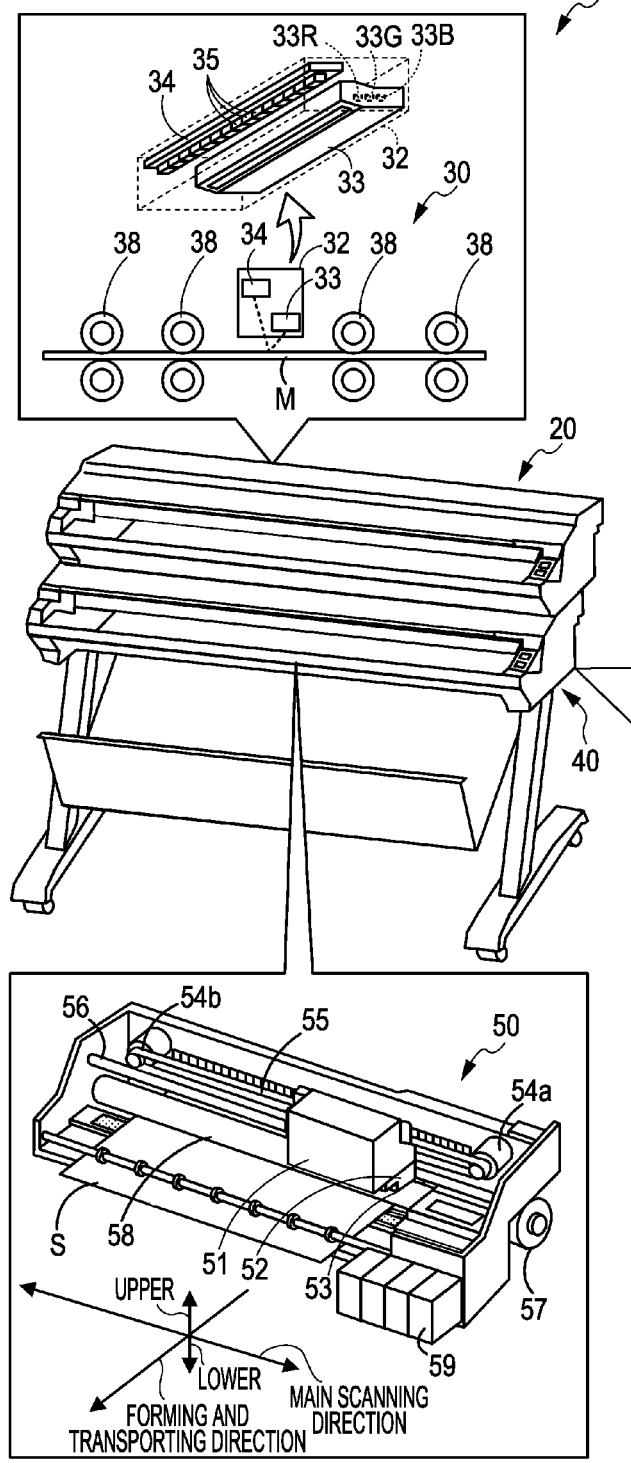
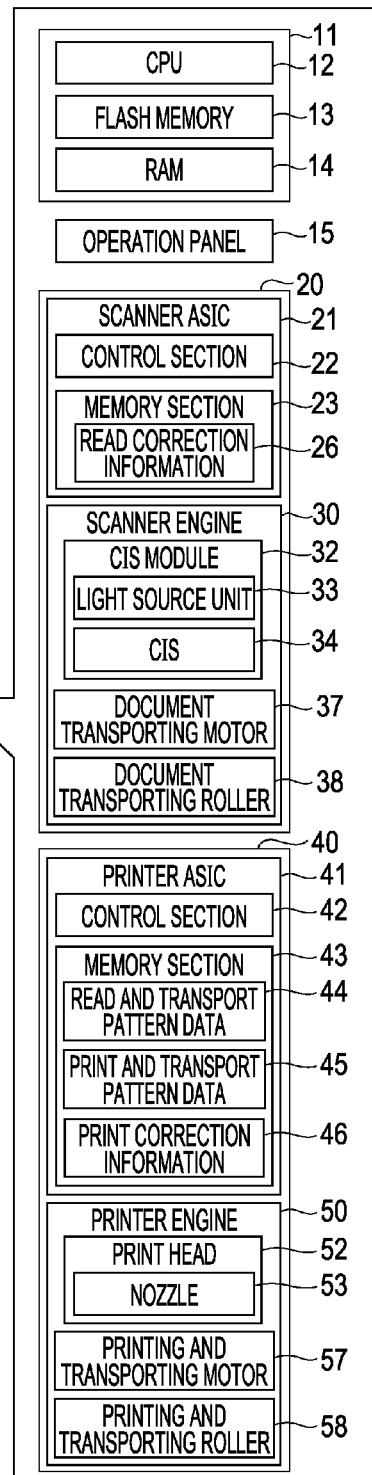

READ AND TRANSPORT CORRECTION PATTERN PRINTING

READ AND TRANSPORT CORRECTION PATTERN READING

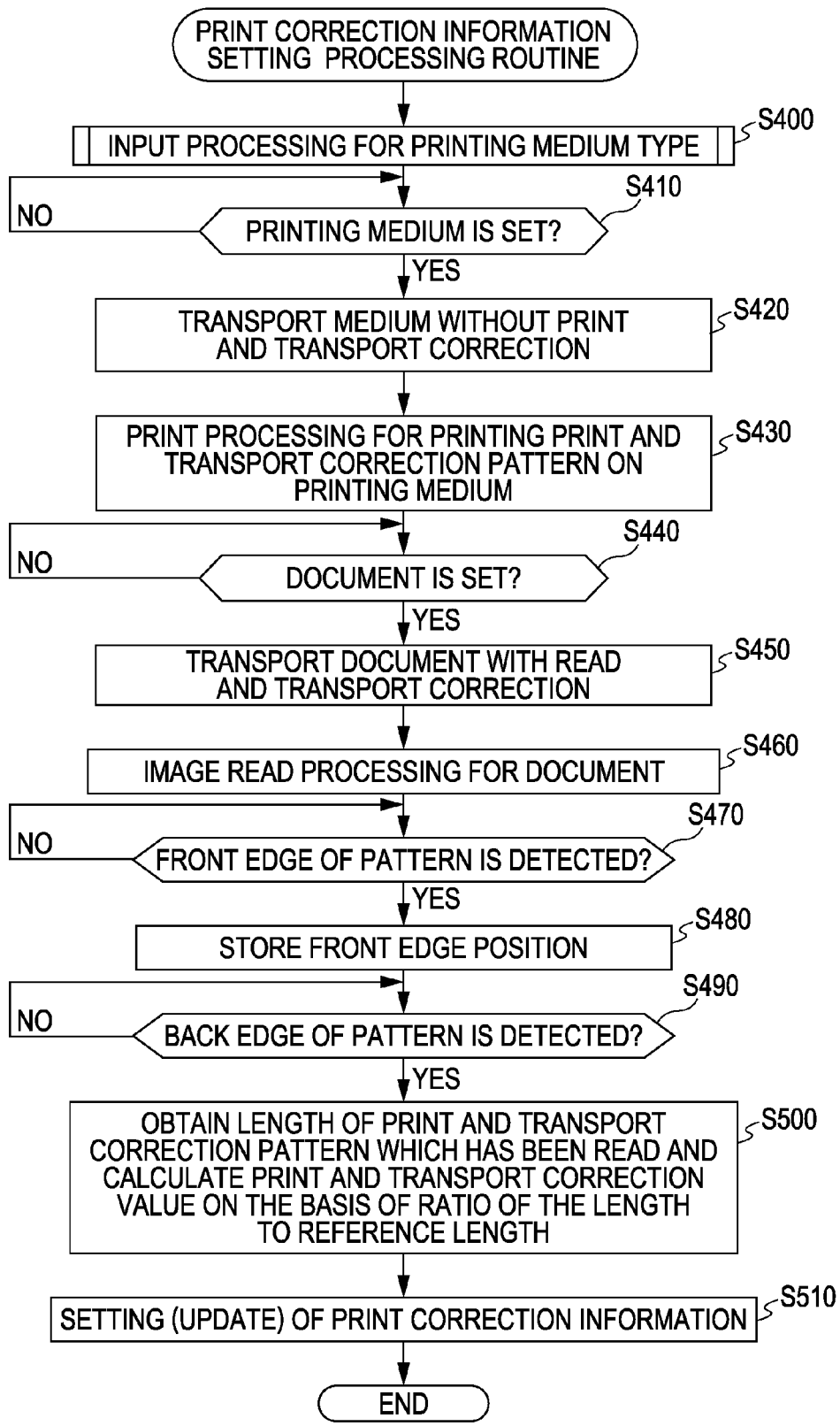

PRINT AND TRANSPORT CORRECTION PATTERN PRINTING

MAIN SCANNING DIRECTION

FORMING AND TRANSPORTING DIRECTION

PRINT AND TRANSPORT CORRECTION PATTERN READING

READING AND TRANSPORTING DIRECTION

MAIN SCANNING DIRECTION

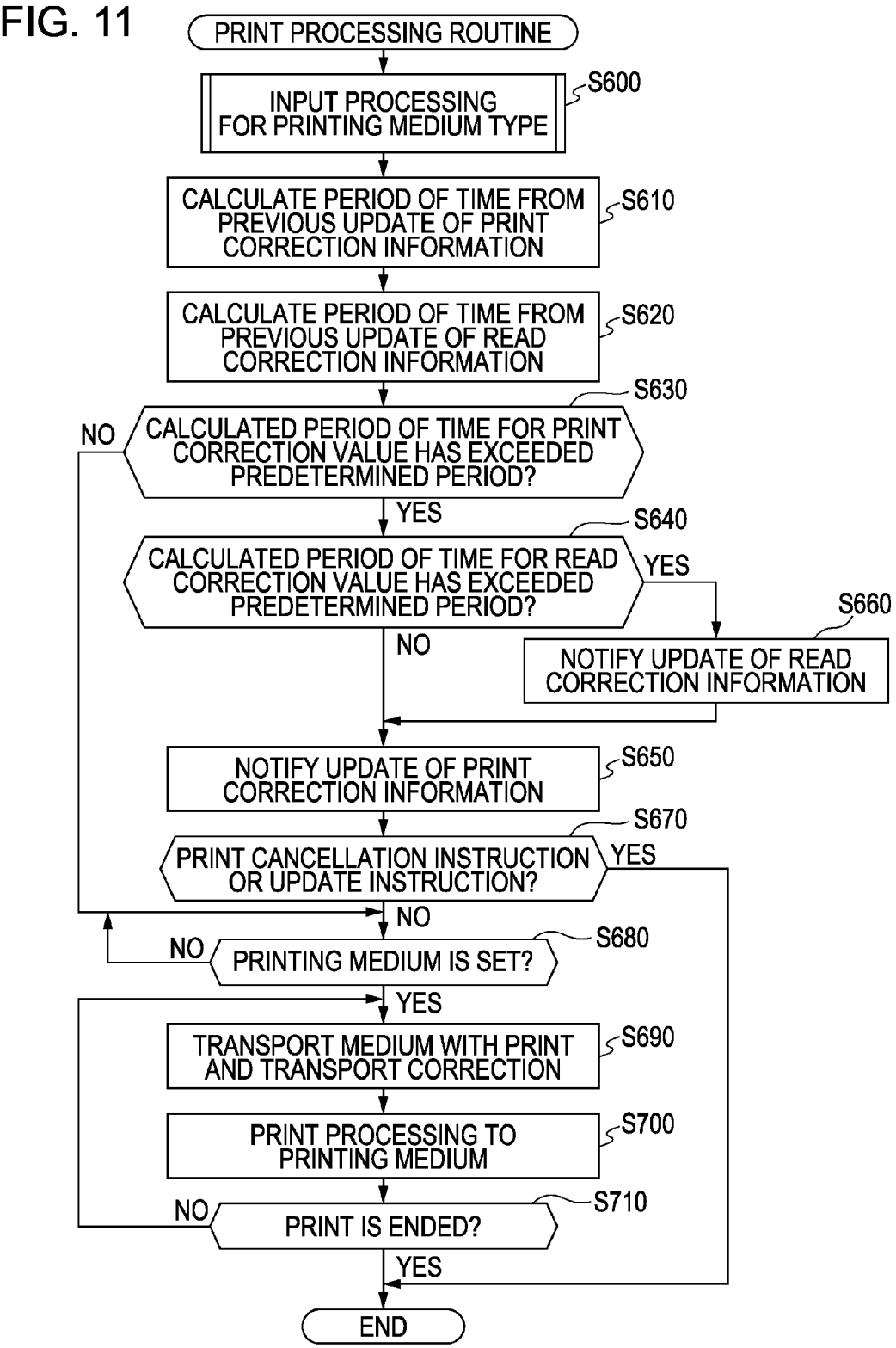

IMAGE READING APPARATUS, IMAGE FORMING SYSTEM, AND METHOD FOR PERFORMING IMAGE AND TRANSPORT CALIBRATION

BACKGROUND

1. Technical Field

The present disclosure relates to an image reading apparatus, an image forming and reading system, a method for controlling an image reading apparatus, a program for the same, and a method for controlling an image forming and reading system.

2. Related Art

In the past, as an image reading apparatus, an apparatus in which, when the number of copies printed reaches a predetermined number, a text sheet on which a calibration image is printed is automatically formed by a printer, the test sheet is transported to an image scanner via a paper path connection apparatus, and the calibration image printed on the text sheet is read by the image scanner has been proposed (see, for example, JP-A-2008-42602). In the apparatus, correction of a color table in the printer is executed by reading the calibration image.

However, in the above-described apparatus, although calibration regarding the color table is taken into consideration, no particular consideration is given, for example, to transport displacement of a print sheet and transport displacement of a document sheet in a reading apparatus, and thus, the apparatus is not capable of adequately solving the disadvantages in terms of execution of proper read processing. Therefore, execution of more appropriate image read processing such as correction regarding transport or the like has been required.

SUMMARY

An advantage of some aspects of the present disclosure is that an image reading apparatus, an image forming and reading system, a method for controlling an image reading apparatus, a program for the same, and a method for controlling an image forming and reading system which enable execution of more appropriate image read processing may be provided.

The present disclosure includes the following aspects.

An image reading apparatus according to an aspect of the present disclosure is an image reading apparatus that uses an image formed by an image forming apparatus including an image forming section that forms an image on a medium and a medium transporting section that transports the medium relative to the image forming section in a predetermined forming and transporting direction, and includes a reading section that reads a document, a document transporting section that transports the document relative to the reading section in a predetermined reading and transporting direction, and a correction control section that, with a medium on which a read correction pattern is formed by the image forming apparatus in a direction intersecting the forming and transporting direction being set as the document, causes the document transporting section to transport the medium on which the read correction pattern is formed such that the reading and transporting direction of the document transporting section extends along the direction intersecting the forming and transporting direction and causes the reading section to read the medium, and sets read correction information for use in correcting a reading condition regarding image read processing of at least one of the reading section and the document transporting section on the basis of a result of the reading.

In the image reading apparatus, a medium on which a read correction pattern is formed by the image forming apparatus in the direction intersecting the forming and transporting direction is set as the document, the medium on which the read correction pattern is formed is transported such that the reading and transporting direction of the document transporting section extends along the direction intersecting the forming and transporting direction, the medium is read, and read correction information for use in correcting a reading condition regarding image read processing is set on the basis of a result of the reading. Thus, the read correction pattern is formed in the direction intersecting the forming and transporting direction. Therefore, the read correction pattern may be formed on the medium with being rarely influenced by the transport state of the image forming apparatus. The read correction pattern thus formed is transported along the reading and transporting direction and is thus read, so that the transport state of the document may be more appropriately figured out. The read correction information which has been set may be used in image read processing for a document of the same type. Therefore, more appropriate image read processing may be executed. In the image reading apparatus, the read correction pattern is preferably a pattern whose longitudinal direction extends along the direction intersecting the forming and transporting direction. Thus, when the medium is transported in the reading and transporting direction, the length of the read correction pattern may be increased, so that an error may be further reduced and the read correction information may be more appropriately set.

According to an aspect of the present disclosure, in the image reading apparatus, the correction control section may cause execution of the image read processing for a document of a type corresponding to the read correction information using the read correction information which has been set. Thus, more appropriate image read processing may be executed.

According to an aspect of the present disclosure, in the image reading apparatus, the correction control section may set the read correction information for use in correcting at least one of a transport distance of the document transporting section and a reading step of the reading section on the basis of the ratio of the length of a pattern contained in the read correction pattern which has been read to a reference length of the read correction pattern which has been stored in advance. Thus, the read correction information may be set in a relatively simple manner using the length.

According to an aspect of the present disclosure, in the image reading apparatus, the correction control section may set the read correction information in which a correction value of the reading condition is associated with each type of document. Thus, more appropriate image read processing may be executed for each document type.

According to an aspect of the present disclosure, in the image reading apparatus, the read correction pattern may be formed so as to have a length greater than at least a circumference of a document transporting roller included in the document transporting section. Thus, an error may be further reduced by transporting the document by rotating the roller 360 degrees or more, so that the read correction information may be more reliably set and furthermore more appropriate image read processing may be executed. In this case, the circumference of the document transporting roller may be the circumference of a roller relating to reading of an image performed by the reading section, i.e., for example, a roller located in the vicinity of the reading section and a roller having the greatest circumference, etc.

According to an aspect of the present disclosure, the image reading apparatus may further include a notifying section that issues a notice to prompt reading of the read correction pattern at a predetermined timing. Thus, the read correction information may be reliably set after the contents of the notification are confirmed, so that more appropriate image read processing may be executed. In this case, the notifying section may issue, in the case where a read instruction for the document is given, if a period of time from a previous reading of a document of the selected type has exceeded a predetermined time, a notice to prompt reading of the read correction patter such that the time when the read instruction is given is the predetermined timing. As another alternative, the notifying section may issue, when a predetermined number of sheets of the document have been read, a notice to prompt reading of the read correction pattern such that the time when the predetermined number of sheets of the document has been read is the predetermined timing. Note that the notifying section may issue the notice by providing a display output, a sound output, or a print output, etc.

An image forming and reading system according to an aspect of the present disclosure includes the above-described image reading apparatus of any one of the above-described aspects of the present disclosure, and an image forming apparatus including an image forming section that forms an image on a medium, a medium transporting section that transports the medium relative to the image forming section in a predetermined forming and transporting direction, and an image forming control section that controls the image forming section and the medium transporting section to cause an image to be formed on the medium, the image forming control section of the image forming apparatus causes the read correction pattern to be formed on the medium in the direction intersecting the forming and transporting direction, and the correction control section of the image reading apparatus causes the read correction pattern formed by the image forming apparatus to be read.

In the image forming and reading system, the image forming apparatus forms a read correction pattern on a medium in the direction intersecting the forming and transporting direction. Also, the image reading apparatus transports, with the read correction pattern formed in the direction intersecting the forming and transporting direction being set as the document, the medium on which the read correction pattern is formed such that the reading and transporting direction extends along the direction intersecting the forming and transporting direction, reads the medium, and sets read correction information on the basis of a result of the reading. Thus, similar to the above-described image reading apparatus, the read correction pattern is formed on the medium with being rarely influenced by the transport state of the image forming apparatus and is thus read, so that the transport state of the document may be more appropriately figured out and the read correction information which has been set may be used in image read processing for a document of the same type. Therefore, more appropriate image read processing may be executed. Note that, in the image forming and reading system, various aspects of the above-described image reading apparatus may be employed, and a step of realizing each function of the above-described image reading apparatus may be added.

According to an aspect of the present disclosure, in the above-described image forming and reading system, the image forming control section may cause the medium transporting section to transport the medium and the image forming section to form an image formation correction pattern on the medium in the forming and transporting direction, and the correction control section may cause the document transporting section to transport the medium on which the image formation correction pattern is formed by the image forming apparatus such that the forming and transporting direction extends along the reading and transporting direction and cause the reading section to read the image formation correction pattern, may set formation correction information for use in correcting an image formation condition regarding image formation processing of at least one of the image forming section and the medium transporting section on the basis of a result of the reading, and may use the read correction information which has been set when executing read processing for the image formation correction pattern or setting of the formation correction information. Thus, reading of the image formation correction pattern and setting of the formation correction information, etc. may be performed using the read correction information, so that more appropriate formation correction information may be set. Therefore, by using the formation correction information, more appropriate image formation processing may be executed. In this case, for setting of the formation correction information, image read processing for the image formation correction pattern may be executed using the read correction information of a document of the same type as that of the medium on which the image formation pattern is formed. As another alternative, the correction control section may set the formation correction information for use in correcting at least one of a transport distance of the medium transporting section and an image formation step of the image forming section on the basis of the ratio of a length of a pattern included in the image formation correction pattern which has been read to a reference length of the image formation correction pattern which has been stored in advance. Thus, the formation correction information may be set in a relatively simple manner. Furthermore, the correction control section may set the formation correction information in which a correction value of the image formation condition is associated with each type of medium. Thus, more appropriate image formation processing may be executed for each medium type. Also, the image formation correction pattern may be formed so as to have a length greater than at least a circumference of a medium transporting roller included in the medium transporting section. Thus, an error may be further reduced by transporting the document by rotating the roller 360 degrees or more, so that more appropriate image formation processing may be more reliably executed. In this case, the circumference of the document transporting roller may be a circumference of a roller relating to formation of an image performed by the image forming section, i.e., for example, a roller located in the vicinity of the image forming section and a roller having the greatest circumference, etc.

According to an aspect of the present disclosure, in the image forming and reading system, the image forming section may form an image by moving an image forming head in the direction intersecting the forming and transporting direction. As another alternative, the image forming section may be a line head formed in the direction intersecting the forming and transporting direction.

According to an aspect of the present disclosure, in the image forming and reading system, the document transporting section of the image reading apparatus and the medium transporting section of the image forming apparatus may be configured so as to be shared by the image reading apparatus and the image forming apparatus. Thus, the configuration of the image forming and reading system may be further simplified.

A method for controlling an image reading apparatus according to an aspect of the present disclosure is a method for controlling an image reading apparatus which is executed by a computer, the image reading apparatus being configured to use an image formed by an image forming apparatus including an image forming section that forms an image on a medium and a medium transporting section that transports the medium relative to the image forming section in a predetermined forming and transporting direction, including a reading section that reads a document and a document transporting section that transports the document relative to the reading section in a predetermined reading and transporting direction, and includes causing, with a medium on which a read correction pattern is formed by the image forming apparatus in a direction intersecting the forming and transporting direction being set as the document, the document transporting section to transport the medium on which the read correction pattern is formed such that the reading and transporting direction of the document transporting section extends along the direction intersecting the forming and transporting direction and causing the reading section to read the medium, and setting read correction information for use in correcting a reading condition regarding image read processing of at least one of the reading section and the document transporting section on the basis of a result of the reading of the medium.

In this method, similar to the above-described image reading apparatus, the read correction pattern formed in the direction intersecting the forming and transporting direction is set as the document, the document on which the read correction pattern is formed is transported such that the reading and transporting direction extends along the direction intersecting the forming and transporting direction and is read, the read correction information is set on the basis of a result of the reading. The read correction information which has been set may be used in image read processing for a document of the same type. Accordingly, more appropriate image read processing may be executed. Note that, in the method for controlling an image reading apparatus, various aspects of the above-described image reading apparatus may be employed, and a step of realizing each function of the above-described image reading apparatus may be added.

A method for controlling an image forming and reading system according to an aspect of the present disclosure is a method for controlling an image forming and reading system which is executed by a computer, the image forming and reading system including an image forming apparatus having an image forming section that forms an image on a medium and a medium transporting section that transports the medium relative to the image forming section in a predetermined forming and transporting direction and an image reading apparatus having a reading section that reads a document and a document transporting section that transports the document relative to the reading section in a predetermined reading and transporting direction, and includes causing, with a medium on which a read correction pattern is formed by the image forming apparatus in a direction intersecting the forming and transporting direction being set as the document, the document transporting section to transport the medium on which the read correction pattern is formed such that the reading and transporting direction of the document transporting section extends along the direction interesting with the forming and transporting direction and causing the reading section to read the medium, setting read correction information for use in correcting a reading condition regarding image read processing of at least one of the reading section and the document transporting section on the basis of a result of the reading of the medium, causing the medium transporting section to transport the medium and the image forming section to form an image formation correction pattern on the medium in the forming and transporting direction, causing the document transporting section to transport the medium on which the image formation correction pattern is formed and causing the reading section to read the image formation correction pattern, and setting formation correction information for use in correcting an image formation condition regarding image formation processing of at least one of the image forming section and the document transporting section on the basis of a result of the reading of the image formation correction pattern to control at least one of the reading section and the document transporting section using the read correction information which has been set in setting the read correction information, thereby executing the image read processing.

According to an aspect of the present disclosure, in this method, similar to the above-described image forming and reading system, the read correction pattern is formed on the medium with being rarely influenced by the transport state of the image forming apparatus and is thus read, so that the transport state of the document may be more appropriately figured out and the read correction information which has been set may be used in image read processing for a document of the same type. Therefore, more appropriate image read processing may be executed. Also, reading of the image formation correction pattern may be performed using the read correction information, so that more appropriate formation correction information may be set by executing more appropriate image read processing. Therefore, using the formation correction information, more appropriate image formation processing may be executed. Note that, in the image forming and reading system, various aspects of the above-described image forming and reading system may be employed, and a step of realizing each function of the above-described image forming and reading system may be added.

A program according to an aspect of the present disclosure is a program for causing one or more computers to realize each step of the above-described method for controlling the image reading apparatus and the above-described method for controlling the image forming and reading system. This program may be recorded in a recording medium (for example, a hard disk, a ROM, a FD, a CD, and a DVD, etc.) which is readable by a computer, and may be distributed from a computer to another computer via a transmission medium (a communication network such as the Internet and a LAN, etc.), and may be transferred in any other forms. When this program is executed by a single computer, or steps of the program are separately executed by a plurality of computers, each step of the above-described method for controlling an image reading apparatus or the above-described method for controlling an image forming and reading system is executed, and thus, similar advantages to those of the control methods may be achieved.

BRIEF DESCRIPTION OF THE DRAWINGS

The invention will be described with reference to the accompanying drawings, wherein like numbers reference like elements.

FIG. 1 is a view schematically illustrating a configuration of a printing and reading system.

FIG. 9 is a flowchart illustrating an example of a print correction information setting processing routine.

FIG. 11 is a flowchart illustrating an example of a print processing routine.

DESCRIPTION OF EXEMPLARY EMBODIMENTS

Figure 2:
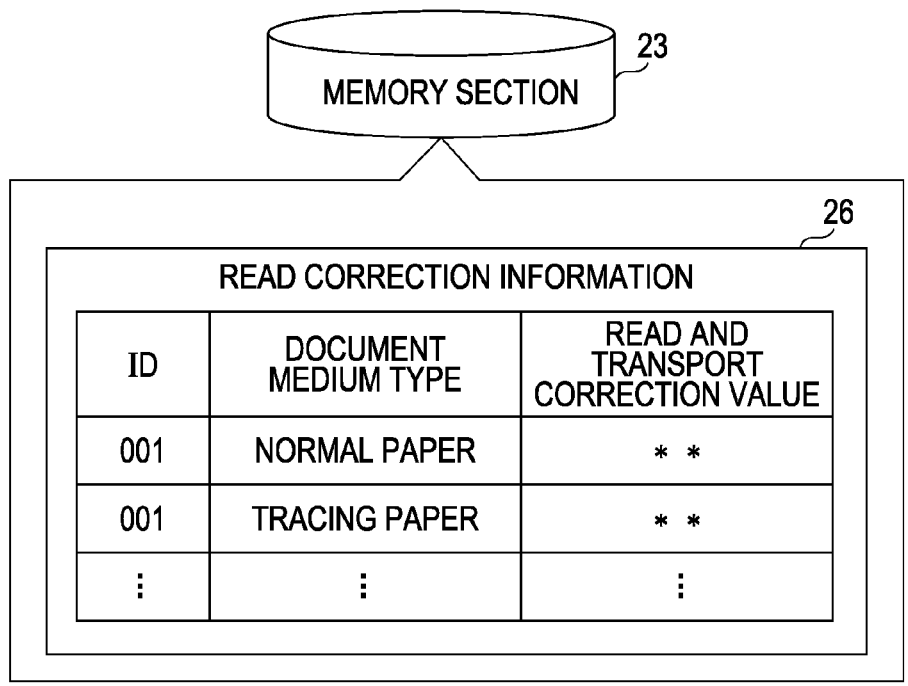
FIG. 2 is a diagram illustrating read correction information stored in a memory section.
Figure 3:
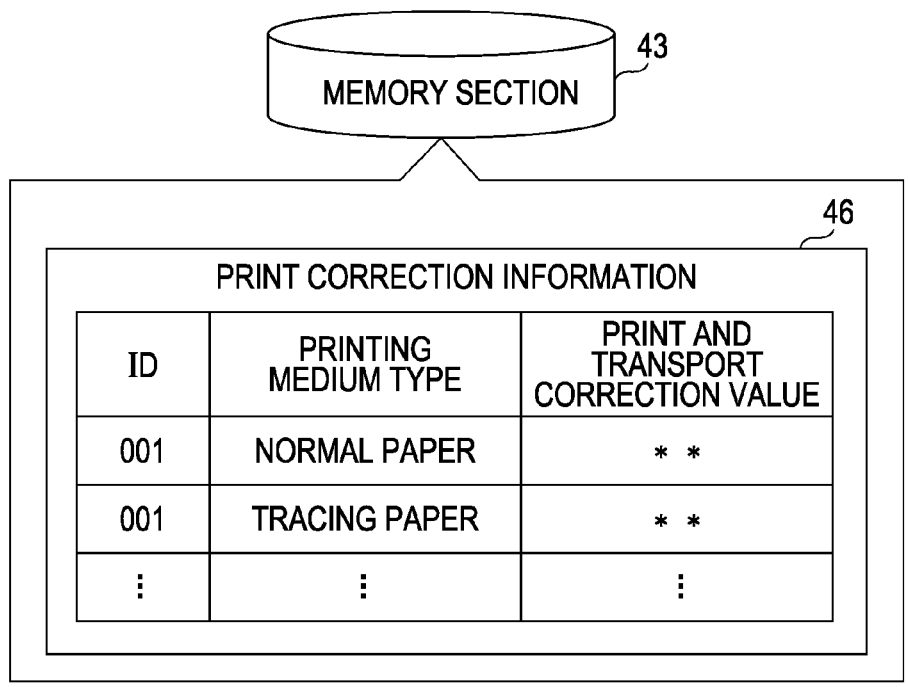
FIG. 3 is a diagram illustrating print correction information stored in a memory section.

Embodiments of the present disclosure will be described with reference to the accompanying drawings. FIG. 1 is a view schematically illustrating a configuration of a printing and reading system 10 according to an embodiment of the present disclosure. FIG. 2 is a diagram illustrating read correction information 26 stored in a memory section 23. FIG. 3 is a diagram illustrating print correction information 46 stored in a memory section 43. The printing and reading system 10 of this embodiment is configured as a multi-function printer capable of wide-format printing and a wide-format document reading (of, for example, a print paper size of A0 and the like). The printing and reading system 10 includes a controller 11 that controls the entire system, an operation panel 15 that enables various user operations, a scanner unit 20 that performs read processing for optically reading a document M to generate image data, and a printer unit 40 that performs print processing for forming an image on a printing medium S using ink as a colorant.

The controller 11 is configured as a microprocessor centered around a CPU 12, and includes a flash memory 13 that stores various processing programs, various types of data, and various tables, a RAM 14 that temporarily stores scan data and print data, and an internal communication interface (I/F) (not illustrated) that communicates with the operation panel 15. The controller 11 receives various operation signals and various detection signals from the scanner unit 20 and the printer unit 40 and also receives an operation signal generated in accordance with an operation of the operation panel 15. The controller 11 also outputs a command to the scanner unit 20 so as to cause the scanner unit 20 to read the document M as image data on the basis of a scan instruction from the operation panel 15, a command to the printer unit 40 so as to cause the printer unit 40 to execute printing of the image data on the basis of a print instruction from a PC (not illustrated), and a display command to the operation panel 15.

The operation panel 15 includes a display section configured as a liquid crystal display that displays an image and an operation section in which keys for performing various inputs are arranged. In the operation section, a mode button for selecting a mode, a selection and setting button for selecting a menu and an item, and a start button for starting scanning, making a photocopy, and printing, etc. are arranged.

The scanner unit 20 includes a scanner ASIC 21 and a scanner engine 30. The scanner ASIC 21 is an integrated circuit that controls the scanner engine 30 and controls, when receiving a scan command from the controller 11, the scanner engine 30 so as to cause the scanner engine 30 to transport the document M and read the document M as image data. The scanner engine 30 includes, as illustrated in the upper part of FIG. 1, a CIS module 32 that emits light on the printing medium M and receives reflected light from the document M to read an image formed on the document M, a document transporting motor 37 that drives document transporting rollers 38, and the plurality of document transporting rollers 38 that are arranged in a transport path including a read position of the CIS module 32 and transport the document M. The document transporting motor 37 and the document transporting rollers 38 function as a document transporting section that transports the document M relative to the CIS module 32 in a predetermined reading and transporting direction. In the CIS module 32, a light source unit 33 that emits light on the printing medium M and a CIS 34 that receives reflected light from the document M and stores the reflected light as electric charge to read the document M are mounted. The light source unit 33 includes three color light sources, i.e., a red LED 33R that lights up red light, a green LED 33G that lights up green light, and a blue LED 33B that lights up blue light, and emits light from the light sources on the printing medium M (see, for example, the upper part of FIG. 1). The CIS 34 is configured so that a plurality of light receiving elements (for example, CMOS image sensors) 35 for one line are arranged in a main scanning direction intersecting the reading and transporting direction, and reads reflected light color by color while sequentially switching between the LEDs 33R, 33G, and 33B to be lighted up, thereby generating color image data.

The scanner ASIC 21 includes a control section 22 that controls each device and the memory section 23 that stores various types of data. Although not illustrated in FIG. 1, the control section 22 includes an LED drive section that separately turns on and off the LEDs 33R, 33G, and 33B of the three colors, an A/D conversion section that receives an analog signal generated in the CIS 34 via an amplifier to convert the analog signal to a digital signal, and a motor drive section that drives the document transporting motor 37 in response to a control signal from the controller 11. As will be described in detail later, the control section 22 has a function of setting the read correction information 26 for use in correcting a document transport state of the document transporting section on the basis of a result of reading the document M for which read and transport pattern data 44 has been formed. The control section 22 also has a function of setting the print correction information 46 for use in correcting a medium transport state of the printing transporting section on the basis of a result of reading the document M for which print and transport pattern data 45 has been formed. The memory section 23 is configured as a nonvolatile memory device and stores the read correction information 26 for use in correcting a reading condition (a transport distance, and a transport displacement, etc.) regarding image read processing of the document transporting section. As illustrated in FIG. 2, the read correction information 26 includes an ID number as identification information, a type of a document medium, and a read and transport correction value (a displacement correction value in transport processing) regarding transport of a document which are associated with one another and are stored for each document type.

As illustrated in FIG. 1, the printer unit 40 includes a printer ASIC 41 and a printer engine 50. The printer ASIC 41 is an integrated circuit that controls the printer engine 50 and controls, when receiving a print command from the controller 11, the printer engine 50 so as to cause the printer engine 50 to transport the printing medium S and form an image with a colorant. As illustrated in the lower part of FIG. 1, the printer engine 50 includes a print head 52 that discharges ink as a colorant to the printing medium S (for example, recording paper) transported onto a platen to perform printing, a printing and transporting motor 57 that drives a printing and transporting roller 58, and the printing and transporting roller 58 that is driven by the printing and transporting motor 57 to transport the printing medium S in a forming and transporting direction (from the back side to the front side as illustrated in FIG. 1). The printing and transporting motor 57 and the printing and transporting roller 58 function as a medium transporting section that transports the printing medium S relative to the print head 52 in a predetermined forming and transporting direction. In accordance with a driving operation of a carriage motor 54*a*, the print head 52 is arranged at a lower surface side of a carriage 51 that is reciprocated, by a belt 55 mounted on a driven roller 54*b*, along a guide 56 in the main scanning direction (the left-right direction) intersecting the forming and transporting direction of the printing medium S. The print head 52 discharges ink of each color from a nozzle 53 provided on the print head 52 such that a voltage is applied to a piezoelectric device to deform the piezoelectric device to pressurize the ink. Note that the print head 52 may be configured to discharge the ink such that a voltage is applied to a heat generating resistance element to heat the ink to pressurize the ink with air bubbles generated by heating the ink. The print head 52 receives supply of the ink from a cartridge 59 that holds separately the inks of yellow (Y), magenta (M), cyan (C), and black (K) each containing water as a solvent and a dye or a pigment as a colorant and is loaded at a mecha frame side. An encoder that detects the position of the carriage 51 is arranged on a back surface of the carriage 51, and thus the management of the position of the carriage 51 is enabled using the encoder.

The printer ASIC 41 includes a control section 42 that controls each device and the memory section 43 that stores various types of data. Although not illustrated in FIG. 1, the control section 42 includes a head drive section that controls discharge of ink by the print head 52, a movement control section that moves the carriage 51 in the main scanning direction, and a motor drive section that drives a printing and transporting motor 57 in response to a control signal from the controller 11. As will be described in detail later, the control section 42 has a function of forming the read and transport pattern data 44 on the printing medium S and a function of forming the print and transport pattern data 45 on the printing medium S. The memory section 43 is configured as a non-volatile memory device, and stores the read and transport pattern data 44 used when displacement correction is performed in transport processing of the scanner unit 20 for transporting the document M, the print and transport pattern data 45 used when displacement correction is performed in transport processing of the printer unit 40 for transporting the printing medium S, and the print correction information 46 for use in correcting a printing condition (a transport distance and a transport displacement, etc.) regarding print processing of the medium transporting section, etc. The read and transport pattern data 44 is picture image data whose longitudinal direction extends along the direction intersecting the transporting direction (forming and transporting direction) in which the printing medium S is transported in the printer unit 40 and which has a length corresponding to the printable width of the printer unit 40 (see, for example, FIGS. 6A and 6B which will be described later). The read and transport pattern data 44 is formed so as to have a length greater than the circumference of the document transporting roller 38 located in the vicinity of the CIS module 32. The memory section 43 also stores the reference length of the read and transport pattern data 44. The print and transport pattern data 45 is a picture image data whose longitudinal direction extends along the forming and transporting direction in the printer unit 40 and which has a length empirically defined so that a transport displacement of the printing medium S can be detected with sufficient precision (see, for example, FIGS. 10A and 10B which will be described later). The print and transport pattern data 45 is formed so as to have a length greater than the circumference of the printing and transporting roller 58 located in the vicinity of the print head 52. In the memory section 43, the reference length of the print and transport pattern data 45 is also stored. Each of the read and transport correction pattern and the print and transport correction pattern is set as a bar code pattern including a plurality of partition lines provided with predetermined intervals between the first mark and the last mark and a straight line connected to the left end of each mark (see, for example, FIGS. 6A and 6B and FIGS. 10A and 10B). As illustrated in FIG. 3, the print correction information 46 contains an ID number as identification information, a type of a printing medium, and a read and transport correction value (a displacement correction value in transport processing) regarding transport of a printing medium which are associated with one another and are stored for each printing medium type.

Figure 4:
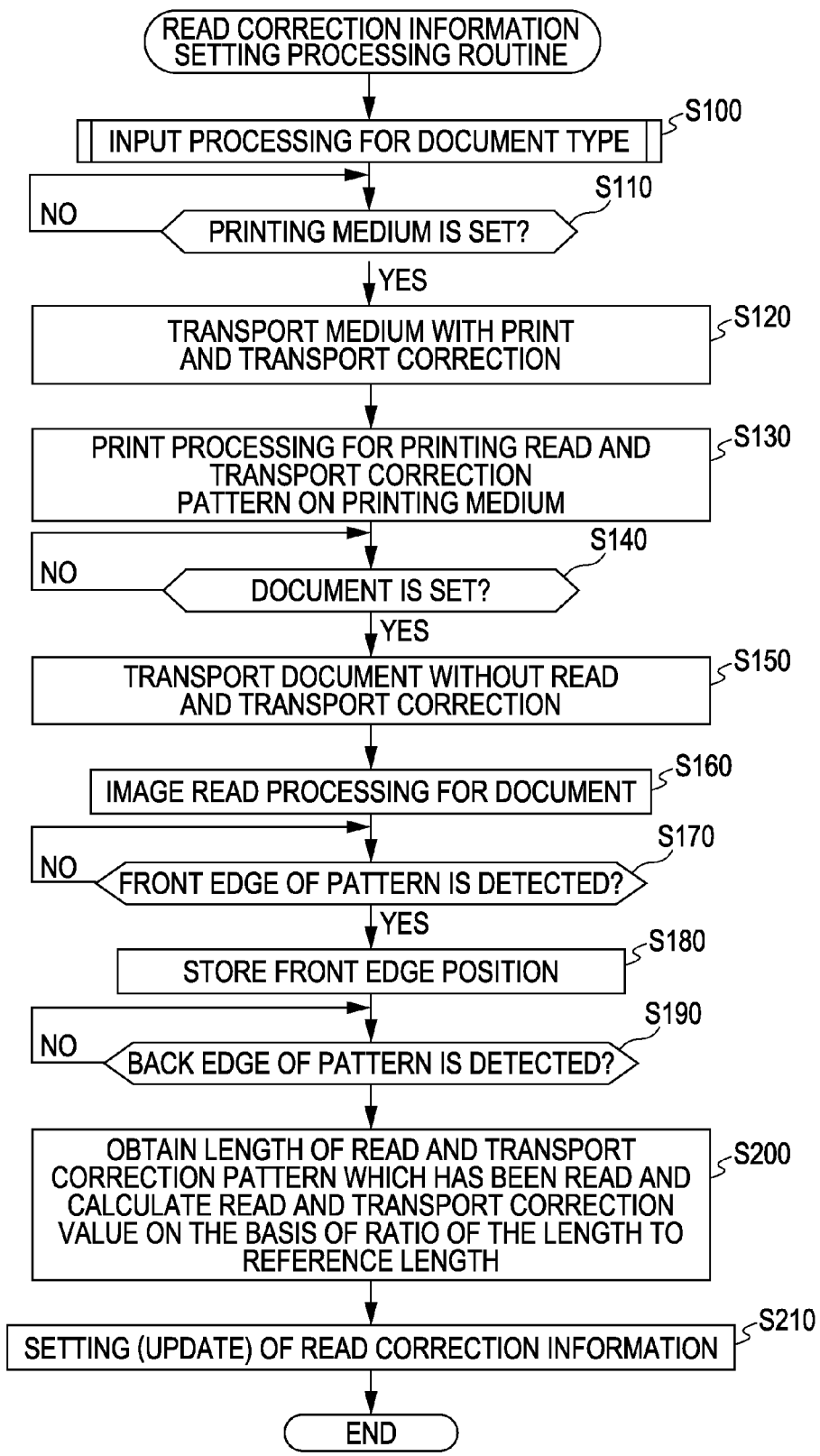
FIG. 4 is a flowchart illustrating an example of a read correction information setting processing routine.
Figure 5:
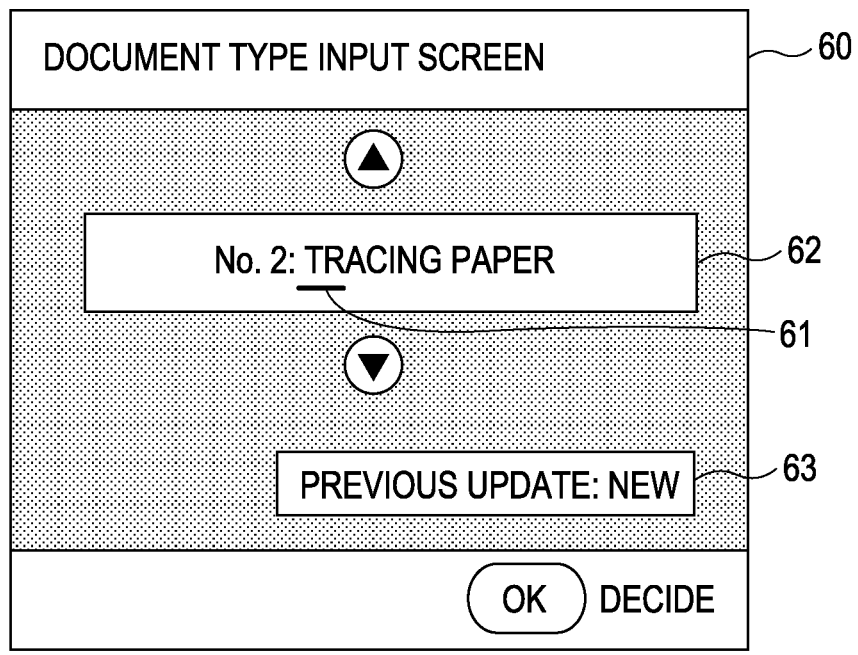
FIG. 5 is a view illustrating a document type input screen.
Figure 6A:
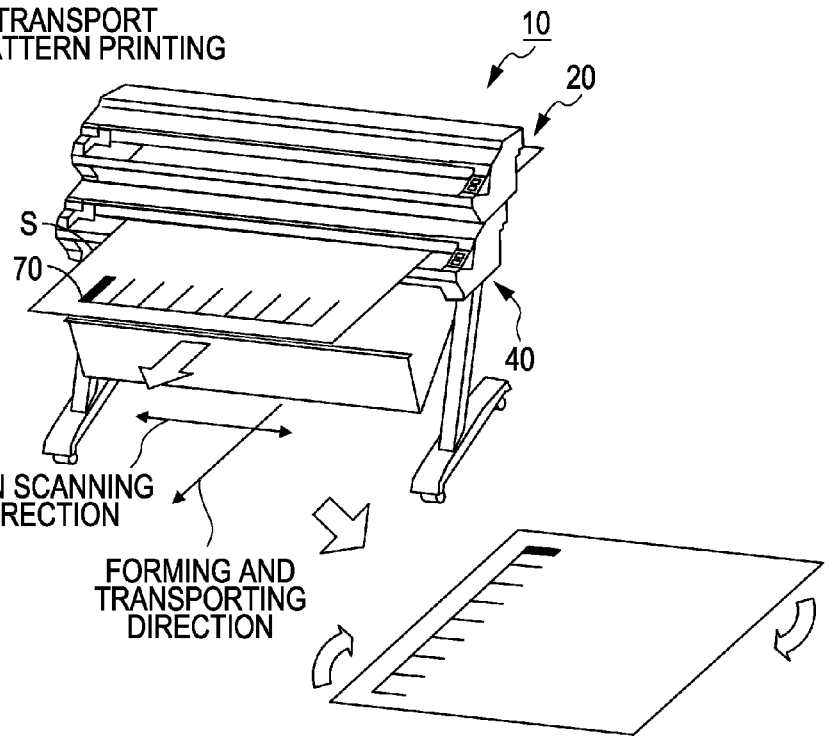
FIGS. 6A and 6B are views illustrating read and transport correction processing.
Figure 6B:
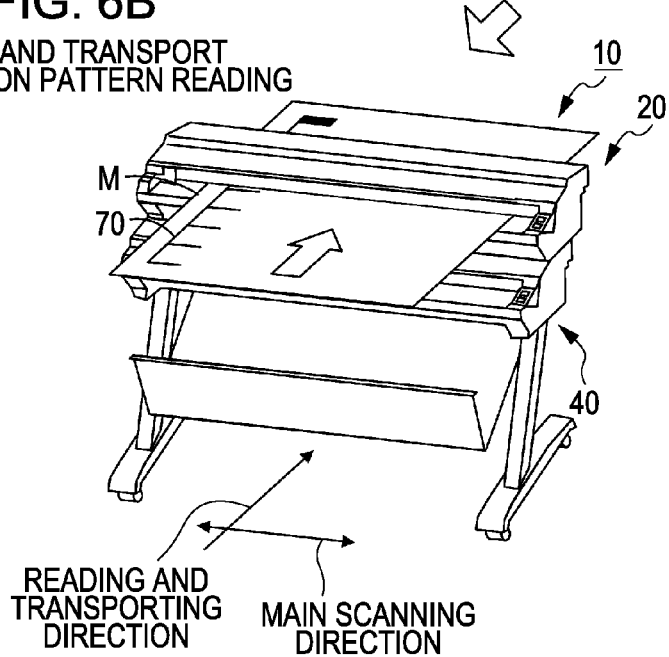

Next, the operation of the printing and reading system 10 of this embodiment having the above-described configuration will be described. First, processing for setting the read correction information 26 will be described. FIG. 4 is a flowchart illustrating an example of a read correction information setting processing routine. FIG. 5 is a view illustrating a document type input screen 60. FIGS. 6A and 6B are views illustrating read and transport correction processing, FIG. 6A is a view illustrating print processing for printing a read and transport correction pattern 70 on the printing medium S, and FIG. 6B is a view illustrating read processing in which the read and transport correction pattern 70 is the document M. For example, after setting processing or update processing for the read correction information 26 is selected on the operation panel 15, the read correction information setting processing routine is executed. In this case, the CPU 12 of the controller 11 is configured to execute this routine by using the functions of the scanner ASIC 21 and the printer ASIC 41. First, when a user of the printing and reading system 10 obtains the document M of a new type or when the user updates the correction value of the document M which has been already set, the user gives an execution instruction for this read correction information setting processing. When the read correction information 26 is set by executing this processing, a transport displacement in read processing may be reduced and a more appropriate read image may be obtained in reading a medium of the same type as that of the document M for which the read correction information 26 has been set.

When this routine is executed, the CPU 12 of the controller 11 executes input processing for inputting the type of document for which the read correction information 26 is to be set (Step S100). In this processing, the display section of the operation panel 15 is caused to display the document type input screen 60 of FIG. 5 to invite the user to input the type of document by a key operation of the user via the operation section (not illustrated). In the document type input screen 60, a cursor 61 that indicates an input position, a type input window 62 in which the document type is inputted, and a previous update display window 63 that displays the period of time from a previous update, etc. are arranged. In the type input window 62, the document type for which the read correction information 26 has been set may be selected by a key operation, and a new document type may also be inputted by a key operation. In the previous update display window 63, if there is no previous update information, "new" is displayed and, if there is previous update information, the period of time from the previous update is displayed. When completing input, the user holds down an OK key to end the input processing.

Next, the CPU 12 determines whether or not the printing medium S is set (Step S110). If the printing medium S is not set, the CPU 12 stands by until the printing medium S is set. In this case, a message saying "Please set document paper of the inputted type in the printer unit 40" may be displayed on the display section of the operation panel 15. The user sets document paper of the inputted type at a paper feeding position in the printer unit 40. When the printing medium S is set, the CPU 12 causes the printing medium S to be transported using the print correction information 46 and with print and transport correction (Step S120), and causes print processing for printing the read and transport correction pattern on the printing medium S to be executed using the read and transport pattern data 44 (Step S130). In this print processing, as illustrated in FIG. 6A, the printing medium S is transported while the print head 52 is moved in the main scanning direction intersecting the forming and transporting direction of the printing medium S to print the read and transport correction pattern 70 whose longitudinal direction extends along the main scanning direction of the print head 52 on the printing medium S. Thus, the read and transport correction pattern 70 is printed with the longitudinal direction thereof extending along the main scanning direction of the print head 52, and therefore, the read and transport correction pattern 70 may be printed on the printing medium S as an image that is only slightly influenced by transport displacement in the printer unit 40.

Next, the CPU 12 determines whether or not the document M is set in the scanner unit 20 (Step S140). If the document M is not set, the CPU 12 stands by until the document M is set. In this case, a message saying "Please rotate the printed printing medium 90 degrees and set it in the scanner unit 20" may be displayed on the display section of the operation panel 15. The user sets as the document M the printing medium S on which the read and transport correction pattern 70 is printed at a paper feeding position in the scanner unit 20. In this case, the user sets the printing medium S on which the read and transport correction pattern 70 is formed at the paper feeding position in the scanner unit 20 such that the reading and transporting direction of the document transporting section extends along the main scanning direction (the direction intersecting the forming and transporting direction) of the printer unit 40.

When the document M is set, the CPU 12 causes the document M to be transported without using the read correction information 26 and without read and transport correction (Step S150), and causes image read processing by the CIS module 32 to be executed (Step S160). Note that the transport processing and the read processing for the document M are continued at least in a period in which Steps S170 to S190 are performed. Next, the CPU 12 determines whether or not the front edge of the read and transport correction pattern 70 is detected (Step S170). If the front edge has not been detected, the processings of Step S150 and S160 are continued. Detection of the read and transport correction pattern 70 may be performed, for example, by detecting an edge of a read image and performing pattern determination for determining whether or not there is a match of the width thereof in the main scanning direction or the like. If the front edge of the read and transport correction pattern 70 is detected, the position of the front edge is stored (Step S180) and whether or not a back edge of the read and transport correction pattern 70 is detected is determined in a similar manner to that in the processing of Step S170 (Step S190).

If the back edge of the read and transport correction pattern 70 is detected, the CPU 12 obtains the length of the read and transport correction pattern 70 which has been read and calculates a read and transport correction value on the basis of the ratio of the obtained length to the reference length of the read and transport correction pattern 70 (Step S200). In this step, for example, a correction value may be calculated such that a value obtained by multiplying the obtained length by the correction value is the reference length. Note that, in the read and transport correction pattern 70, the partition line located in an intermediate area may be used for determining whether or not the document M has been transported correctly, for example, without having a transport skew or a paper jam, etc. Then, the calculated read and transport correction value is accompanied with the document type to set the read correction information 26 (Step S210), and the routine is ended. In this case, for the document type for which the correction value has been stored before the previous setting, processing for updating the read and transport correction value associated with the document type with a new correction value is performed. Thus, read correction information in which the correction value under the read and transport condition is associated with each document type is set.

Figure 7:
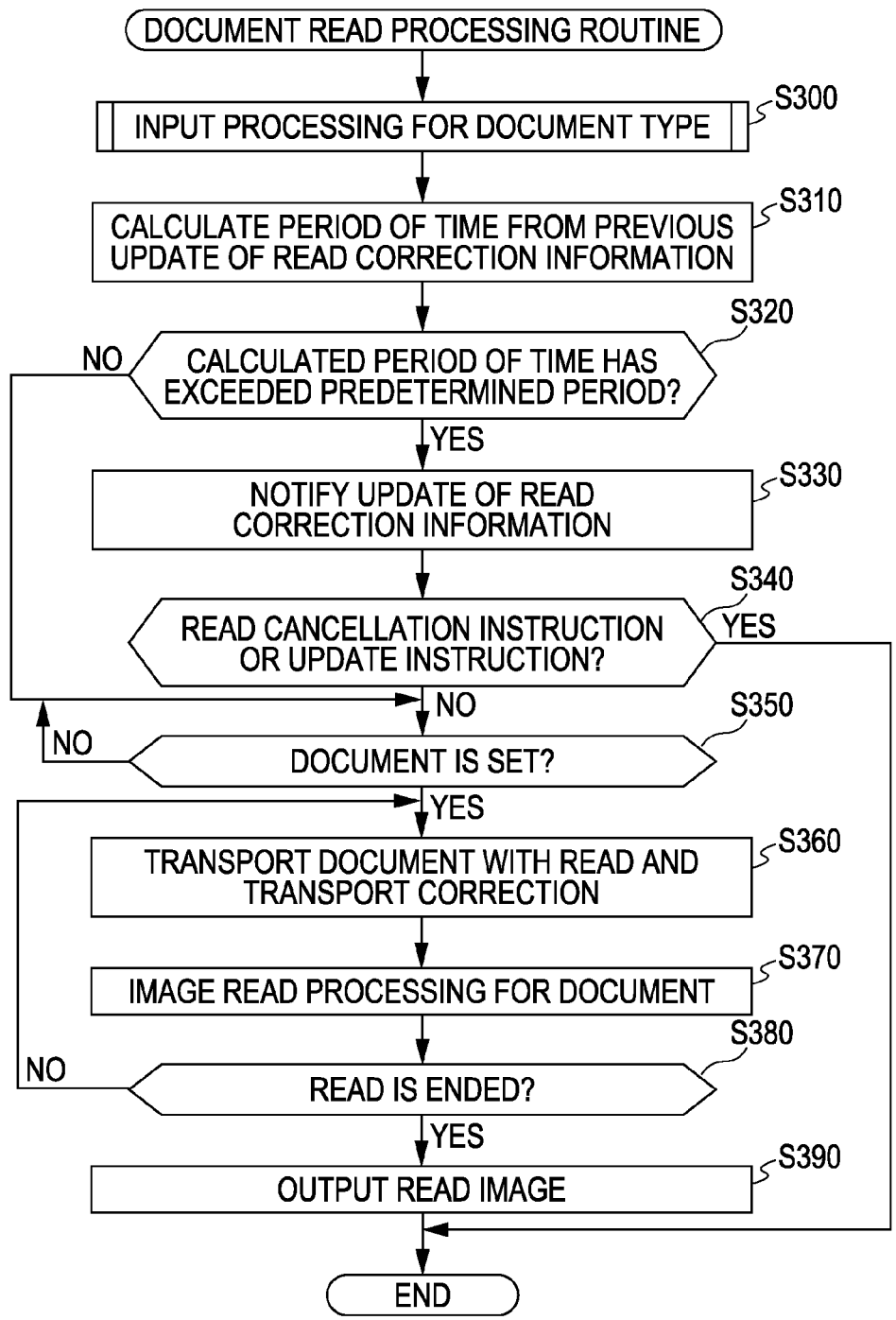
FIG. 7 is a flowchart illustrating an example of a document read processing routine.
Figure 8:
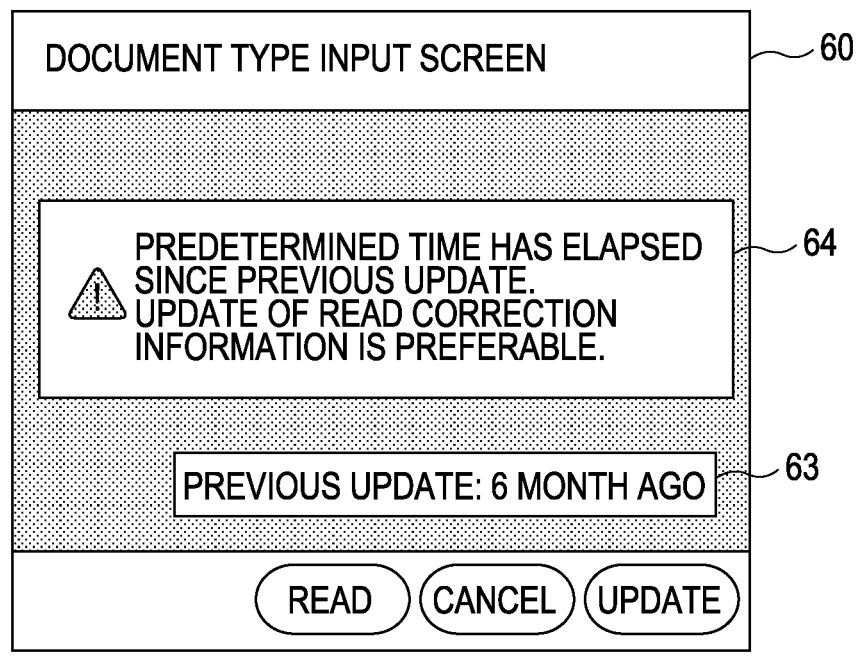
FIG. 8 is a view illustrating a message display window.

Next, processing performed when normal reading of the document M is performed using the read correction information 26 will be described. FIG. 7 is a flowchart illustrating an example of a document read processing routine. FIG. 8 is a view illustrating a message display window 64. For example, after the power is turned on, a document read instruction is given by an operation by a user via the operation panel 15, this routine is executed. In this case, the CPU 12 of the controller 11 executes the routine using the function of the scanner ASIC 21.

When the routine is executed, the CPU 12 of the controller 11 executes input processing for inputting the type of document which is to be read (Step S300). In this processing, the display section of the operation panel 15 is caused to display a similar screen on the printing medium type input screen 60 of FIG. 5, and invite the user to input the type of document by key operation via the operation section (not illustrated). Next, the period of time from the previous setting of the correction value corresponding to the inputted document type in the read correction information 26 is calculated (Step S310), and whether or not the calculated period of time has exceeded a predetermined period is determined (Step S320). The predetermined period may be empirically set to be, for example, a period in which a transport displacement of the document transporting rollers 38 or the like increases over time, and may be, for example, three months, six months, or one year, etc. In this case, assuming that the predetermined period is set to be six months, the following description will be given.

In Step S320, if the calculated period of time has not exceeded the predetermined period, the CPU 12 determines whether or not the document M is set (Step S350). On the other hand, if the calculated period of time has exceeded the predetermined period, the CPU 12 notifies the user that it is preferable to execute update of the read correction information 26 (Step S330). In this case, as illustrated in FIG. 8, the user is notified that it is preferable to execute update of the read correction information 26 by a message saying so in the message display window 64 in the document type input screen 60 displayed on the display section of the operation panel 15. Subsequently, whether or not a read cancellation instruction or an update instruction for the read correction information 26 is given is determined on the basis of an input from the operation panel 15 (Step S340). If the read cancellation instruction or the update instruction for the read correction information 26 is given, the above-described read correction information setting processing routine is executed. On the other hand, if the read cancellation instruction or the update instruction for the read correction information 26 is not given, whether or not the document M is set is determined (Step S350). If the document M is not set, the CPU 12 stands by until the document M is set. If the document M is set, the document M is transported using the read correction information 26 (Step S360), and image read processing for the document M is executed (Step S370). In this case, in transport processing for the document M using the read correction information 26, for example, the transport distance is finely adjusted in accordance with the read transport correction value set in the read correction information 26 by increasing the number of steps of the document transporting motor 37.

Subsequently, the CPU 12 determines whether or not the read processing is ended on the basis of whether or not the back edge of the document M is off from the document transporting rollers 38 (Step S380). If the read processing is not ended, the processings of Step S360 and S370 are repeatedly executed. On the other hand, if the read processing is ended, the read image is outputted (Step S390), and this routine is ended. Thus, by notifying execution of read and transport correction to encourage update of the read correction information 26, read processing for the document M is executed while the probability of the occurrence of a transport displacement of the document M is reduced, so that more appropriate image read processing may be executed.

Figure 10A:
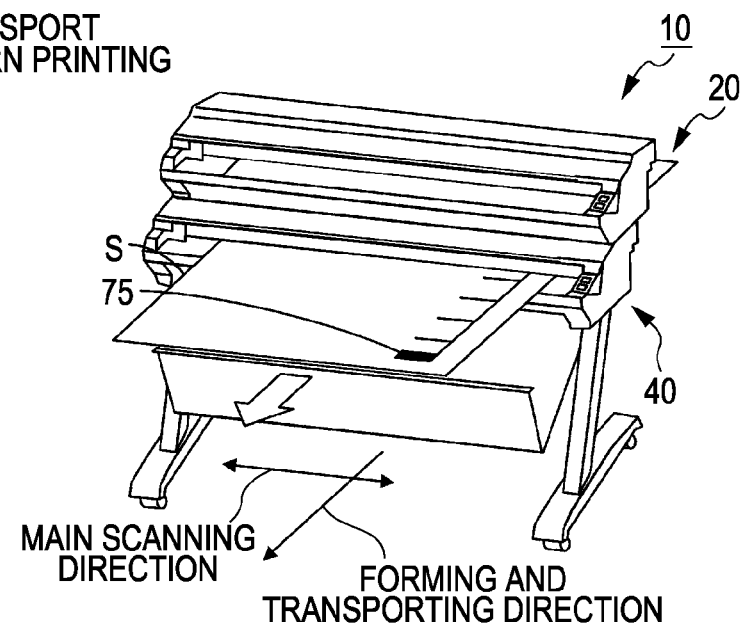
FIGS. 10A and 10B are views illustrating print and transport correction processing.
Figure 10B:
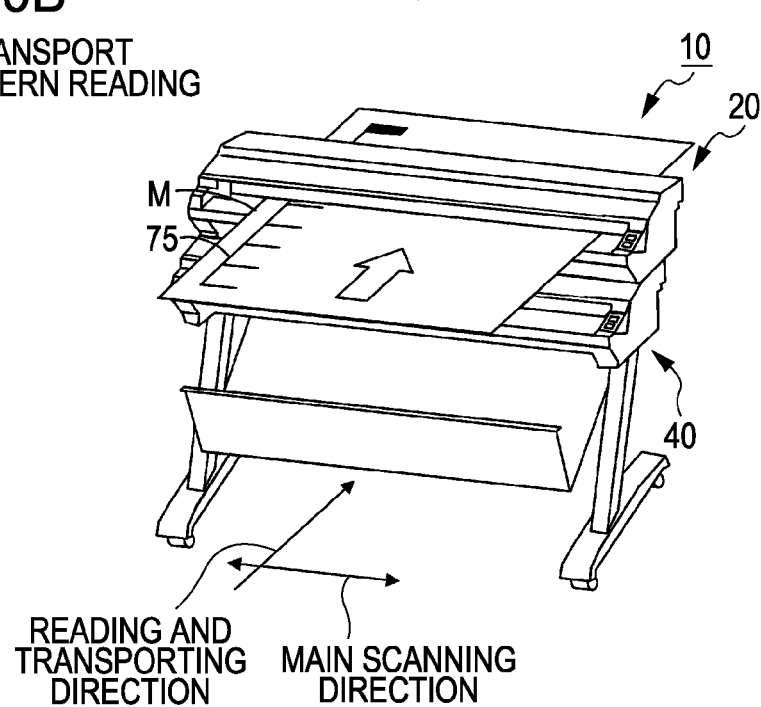

Subsequently, processing for setting the print correction information 46 will be described. FIG. 9 is a flowchart illustrating an example of a print correction information setting processing routine. FIGS. 10A and 10B are views illustrating print and transport correction processing. FIG. 10A is a view illustrating print processing for printing a print and transport correction pattern 75 on the printing medium S. FIG. 10B is a view illustrating read processing in which the print and transport correction pattern 75 is the document M. For example, after setting processing for the print correction information 46 is selected on the operation panel 15, the print correction information setting processing routine is executed. In this case, the CPU 12 of the controller 11 executes the routine using the functions of the scanner ASIC 21 and the printer ASIC 41. First, when a user of the printing and reading system 10 obtains a new type of the printing medium S or when the user updates the correction value of the document M which has been already set, the user gives an execution instruction for the print correction information setting processing. When the print correction information 46 is set by executing this processing, a transport displacement in read processing may be reduced and a more appropriate read image may be obtained in printing the print correction information 46 on the printing medium S for which the print correction information 46 has been set. In this case, assuming that the read correction information 26 used when a new printing medium S is read as the document M has been already set, the following description will be given.

When this routine is executed, the CPU 12 of the controller 11 executes input processing for inputting the type of a printing medium for which the print correction information 46 is to be set (Step S400). In this processing, the display section of the operation panel 15 is caused to display a similar screen on the printing medium type input screen 60 of FIG. 5 to invite the user to input the type of the printing medium by a key operation of the operation section (not illustrated) by the user. Although not illustrated, in the print medium type input screen, a cursor that indicates an input position, a type input window to which the printing medium type is inputted, and a previous update display window that displays the period of time from the previous update, etc. are arranged. In the previous update display window, if there is no previous update information, "new" is displayed and, if there is previous update information, the period of time from the previous update is displayed. When completing input, the user holds down an OK key to end the input processing.

Next, the CPU 12 determines whether or not the printing medium S is set (Step S410). If the printing medium S is not set, the CPU 12 stands by until the printing medium S is set. In this case, a message saying "Please set a printing medium of the inputted type in the printer unit 40" may be displayed on the display section of the operation panel 15. The user sets the printing medium S of the inputted type at a paper feeding position in the printer unit 40. When the printing medium S is set, the CPU 12 causes the printing medium S to be transported without using the print correction information 46 and without print and transport correction (Step S420), and causes print processing for printing the print and transport correction pattern on the printing medium S to be executed using the print and transport pattern data 45 (Step S430). In this print processing, as illustrated in FIG. 10A, the printing medium S is transported while the print head 52 is moved in the main scanning direction intersecting the forming and transporting direction of the printing medium S to print the print and transport correction pattern 75 whose longitudinal direction extends along the forming and transporting direction of the printing medium S on the printing medium S. Thus, the print and transport correction pattern 75 is printed with the longitudinal direction thereof extending along the forming and transporting direction, and therefore, the print and transport correction pattern 75 may be printed on the printing medium S as an image for which detection of transport displacement of the printer unit 40 may be easily performed.

Next, the CPU 12 determines whether or not the document M is set in the scanner unit 20 (Step S440). If the document M is not set, the CPU 12 stands by until the document M is set. In this case, a message saying "Please set a printed printing medium in the scanner unit 20 such that the forming and transporting direction extends along the reading and transporting direction" may be displayed on the display section of the operation panel 15. The user sets as the document M the printing medium S on which the print and transport correction pattern 75 is printed at the paper feeding position in the scanner unit 20. In this case, the user sets the printing medium S on which the print and transport correction pattern 75 is formed at the paper feeding position in the scanner unit 20 such that the reading and transporting direction of the document transporting section extends along the forming and transporting direction of the printer unit 40.

When the document M is set, the CPU 12 causes the document M to be transported using the read correction information 26 and with read and transport correction (Step S450), and causes image read processing by the CIS module 32 to be executed (Step S460). Note that the transport processing and the read processing for the document M are continued at least in a period in which Steps S470 to S490 are performed. Next, the CPU 12 determines whether or not the front edge of the print and transport correction pattern 75 is detected (Step S470). If the front edge has not been detected, the processings of Step S450 and S460 are continued. Detection of the print and transport correction pattern 75 may be performed, for example, by detecting an edge of a read image and performing pattern determination for determining whether or not there is a match of the width thereof or the like. If the front edge of the print and transport correction pattern 75 is detected, the position of the front edge is stored (Step S480), and whether or not a back edge of the print and transport correction pattern 75 is detected is determined in a similar manner to that in the processing of Step S190 (Step S490).

If the back edge of the print and transport correction pattern 75 is detected, the CPU 12 obtains the length of the print and transport correction pattern 75 which has been read and calculates a print and transport correction value on the basis of the ratio of the obtained length to the reference length of the print and transport correction pattern 75 (Step S500). In this step, for example, a correction value may be calculated such that a value obtained by multiplying the obtained length by the correction value is the reference length. Note that, in the print and transport correction pattern 75, the partition line located in an intermediate area may be used for determining whether or not the document M has been transported correctly, for example, without having a transport skew or a paper jam, etc. Then, the calculated print and transport correction value is associated with the type of the printing medium to set the print correction information 46 (Step S510), and the routine is ended. In this case, for the type of the printing medium for which the correction value has been stored before the previous setting, processing for updating the correction with a new correction value is performed. Thus, print correction information in which the correction value under the print and transport condition is associated with each type of the printing medium is set by reading the print and transport correction pattern 75 without a transport displacement in read processing.

Next, processing performed when normal printing of the document M using the print correction information 46 is performed will be described. FIG. 11 is a flowchart illustrating an example of a print processing routine. For example, after the power is turned on, a print instruction for a print image is given by an operation by a user via the operation panel 15, and then, this routine is executed. In this case, the CPU 12 of the controller 11 executes the routine using the function of the printer ASIC 41.

When the routine is executed, the CPU 12 of the controller 11 executes input processing for inputting the type of a printing medium which is to be printed (Step S600). In this processing, the display section of the operation panel 15 is caused to display a similar screen on the printing medium type input screen 60 of FIG. 5, and the type of the printing medium is inputted by a key operation of the user via the operation section (not illustrated). Next, the period of time from the previous setting of the correction value corresponding to the inputted type of the printing medium in the print correction information 46 is calculated (Step S610), and the period of time from the previous setting of the correction value corresponding to the inputted type of the printing medium (the type of the printing medium as a document) in the read correction information 26 is calculated (Step S620). Subsequently, whether or not the calculated period of time for the print and transport correction value of the print correction information 46 has exceeded a predetermined period is determined (Step S630). The predetermined period may be empirically set to be, for example, a period in which a transport displacement of the document transporting rollers 38 or the like increases over time, and may be, for example, three months, six months, or one year, etc. In this case, assuming that the predetermined period is set to be six months, the following description will be given.

In Step S630, if the calculated period has not exceeded the predetermined period, the CPU 12 determines whether or not the printing medium S is set (Step S680). On the other hand, if the calculated period of time has exceeded the predetermined period, the CPU 12 further determines whether or not the calculated period of time for the read and transport correction value of the read correction information 26 has exceeded a predetermined time (Step S640). The predetermined time in this step may be the same as the predetermined period described above, and may be a different period. If the calculated period of time for the read and transport correction value of the read correction information 26 has not exceeded the predetermined time, the CPU 12 notifies the user that it is preferable to execute update of the print correction information 46 (Step S650). In this case, the user is notified that it is preferable to execute update of the print correction information 46 by a message saying so displayed as in the message display window 64 of FIG. 8. On the other hand, if the calculated period of time for the read and transport correction value of the read correction information 26 has exceeded the predetermined time, the CPU 12 notifies the user that it is preferable to execute update of the print correction information 46 and the read correction information 26 (Steps S650 and S660). In this case also, the user is notified that it is preferable to execute update of the print correction information 46 and the read correction information 26 by a message saying so displayed as in the message display window 64 of FIG. 8.

Subsequently, whether or not a print cancellation instruction or an update instruction for the read correction information 26 and the print correction information 46 is given is determined on the basis of an input from the operation panel 15 (Step S670). If the print cancellation instruction or the update instruction for read and transport correction or print and transport correction is given, this routine is ended as it is. Note that if the instruction for updating the read correction information 26 is given, the above-described read correction information setting processing routine is executed and, if the update instruction for the print correction information 46 is given, the above-described print correction information setting processing routine is executed. On the other hand, if the print cancellation instruction or the update instruction is not given, whether or not the printing medium S is set is determined (Step S680). If the printing medium S is not set, the CPU 12 stands by and, if the printing medium S is set, the printing medium S is transported using the print correction information 46 (Step S690), and print processing for printing on the printing medium S is executed (Step S700). In this case, in transport processing for the printing medium S using the print correction information 46, for example, the transport distance of the printing medium S is finely adjusted in accordance with the print transport correction value set in the print correction information 46 by increasing the number of steps of the printing and transporting motor 57.

Subsequently, the CPU 12 determines whether or not the print processing is ended on the basis of whether or not the back edge of the printing medium S is off from the printing and transporting roller 58 (Step S710). If the print processing is not ended, the processings of Steps S690 and S700 are repeatedly executed. On the other hand, if the print processing is ended, this routine is ended. Thus, by notifying execution of update of read correction information 26 and the print correction information 46 to encourage update of the read correction information 26 and the print correction information 46, print processing for printing the printing medium S is executed while the probability of the occurrence of a transport displacement of the document M and a transport displacement of the printing medium S is reduced, so that more appropriate print processing may be executed.

The correspondence relationship between constituent elements of this embodiment and constituent elements of aspects of the present disclosure will be hereinafter clarified. The CIS module 32 according to this embodiment corresponds to the reading section according to an aspect of the present disclosure, the document transporting motor 37 and the document transporting rollers 38 correspond on the printing medium transport section, the controller 11 and the scanner ASIC 21 correspond to the correction control section, the read and transport correction pattern 70 corresponds to the read correction pattern, the read correction information 26 corresponds to the read correction information, and the controller 11 and the operation panel 15 correspond to the notifying section. Furthermore, the print head 52 corresponds to the image forming section, the printing and transporting motor 57 and the printing and transporting roller 58 correspond to the medium transporting section, and the print correction information 46 corresponds to the formation correction information. Note that, in this embodiment, by describing the operation of the printing and reading system 10, an example of a method for controlling an image reading apparatus and an example of a method for controlling an image forming and reading system according to aspects of the present disclosure have also been made clear.

According to this embodiment, in the printing and reading system 10 described above, the printing medium S on which the read and transport correction pattern 70 whose longitudinal direction extends along the main scanning direction (the direction intersecting the forming and transporting direction) of the printer engine 50 is the document M, the printing medium S is transported such that the reading and transporting direction extends along the main scanning direction, the printing medium S is read, and the read correction information 26 for use in correcting a transport displacement of the document M is set on the basis of a result of the reading. Thus, the read and transport correction pattern 70 is formed in the main scanning direction, and therefore, the read and transport correction pattern 70 may be formed on a printing medium with being rarely influenced by a transport state of the printer unit 40. Moreover, the read and transport correction pattern 70 thus formed is transported along the reading and transporting direction and is read, and therefore, the transport state of a document may be more appropriately figured out. Furthermore, the read and transport correction pattern 70 is formed on a printing medium to serve as an actual document M and the read correction information 26 is set, and therefore, as compared to the case where the read and transport correction pattern 70 is formed on a printing medium of some other type and the read correction information 26 is set using the printing medium, more precise read correction information 26 may be set. The read correction information 26 which has been set may be used in image read processing for a document of the same type. Accordingly, a more appropriate image may be obtained. The longitudinal direction of the read and transport correction pattern 70 extends along the main scanning direction, and therefore, the read correction information 26 may be more appropriately updated.

Image read processing for a document of a type corresponding to the read correction information 26 is executed using the read correction information 26, and thus, more appropriate image read processing may be executed. Furthermore, the read correction information 26 for use in correcting the transport distance is set on the basis of the ratio of the length of the read and transport correction pattern 70 which has been read to the reference length stored in advance, and thus, read correction information may be set in a relatively simple manner. In addition, the read correction information 26 in which a read and transport correction value is associated with each document type is set, and thus, more appropriate image read processing may be executed for each document type. The read and transport correction pattern 70 is formed so as to have a length greater than the circumference of the document transporting roller 38 located in the vicinity of the CIS module 32, so that the read correction information 26 may be more reliably set, and furthermore, more appropriate image read processing may be executed. At a predetermined timing, i.e., for example, at the time when an instruction for reading a document is given, if the period of time from the previous reading of the document of the selected type has exceeded a predetermined period, a notice to prompt reading the read and transport correction pattern 70 is issued. Therefore, read correction information may be more reliably set, and more appropriate image read processing may be executed.

Also, the print and transport correction pattern 75 whose longitudinal direction extends along the forming and transporting direction is formed on the printing medium S, the printing medium S is transported such that the forming and transporting direction extends along the reading and transporting direction, image read processing is executed by the CIS module 32 using the read correction information 26 which has been set in advance to read the print and transport correction pattern 75, and the print correction information 46 for use in correcting a transport distance (a transport displacement) of the printing medium S is set on the basis of a result of the reading. Thus, more appropriate print correction information 46 may be set. Using the print correction information 46, more appropriate print processing may be executed. Accordingly, a more appropriate print image may be obtained. In this case, for setting of the print correction information 46, image read processing for the print and transport correction pattern 75 is executed using the read correction information 26 for the document of the same type as that of the printing medium on which the print and transport correction pattern 75 is formed. Therefore, more appropriate image read processing is executed, so that more appropriate print correction information 46 may be set. Moreover, the print correction information 46 for use in correcting a transport distance (a transport displacement) of the medium transporting section is set on the basis of the ratio of the length of the print and transport correction pattern 75 to the reference length, and thus, the print correction information 46 may be set in a relatively simple manner. Furthermore, the print correction information 46 in which a print and transport correction value is associated with each printing medium type, and thus, more appropriate print processing may be executed for each printing medium type. Furthermore, the print and transport correction pattern 75 is formed so as to have a length greater than the circumference of the printing and transporting roller 58 located in the vicinity of the print head 52, so that the print correction information 46 may be more reliably set, and more appropriate print processing may be executed.

Note that the present disclosure is no way limited to the above-described embodiment, and can be modified so long as the modification does not depart from the technical scope of the invention.

For example, in the above-described embodiment, for a transport displacement at the document transporting roller 38, the read correction information 26 including the read and transport correction value for use in adjusting the transport distance is set. However, as long as the read correction information 26 is information for use in correcting a transport displacement in image read processing, the read correction information 26 is not particularly limited thereto. For example, read correction information including a read correction value for use in correcting the number of read steps of the CIS 34 of the CIS module 32 may be set. The number of read steps may be, for example, the number of lines that the CIS 34 reads while the document M is transported for a predetermined distance. That is, if the number of lines to be read while the document M is transported for the predetermined distance is increased, an image has a large length along the transporting direction, and on the other hand, if the number of lines to be read is reduced, an image has a small length along the transporting direction. As a result, a transport displacement may be corrected. Also, in the above-described embodiment, for a transport displacement at the document transporting roller 38, processing for adjusting the transport distance is performed. However, processing for adjusting the number of read steps of the CIS 34 of the CIS module 32 may be performed. Even in such a case, more appropriate image read processing may be executed, and a more appropriate read image may be obtained.

Although, in the above-described embodiment, the read correction information 26 in which a read and transport correction value is associated with each type of document, the present disclosure is not particularly limited thereto. Read correction information in which a read and transport correction value is associated with a single document type may be set. Even in such a case, for a document for which read correction information is set, more appropriate image read processing may be executed.

Although, in the above-described embodiment, the read and transport correction pattern 70 is formed so as to have a length greater than the circumference of the document transporting roller 38, the present disclosure is not limited thereto. Also, in the above-described embodiment, the read and transport correction pattern 70 is formed so as to have a length greater than the circumference of the document transporting roller 38 located in the vicinity of the CIS module 32. However, the read and transport correction pattern 70 may be formed so as to have a length greater than the circumference of a largest one of document transporting rollers relating to image read processing.

Although, in the above-described embodiment, when the period of time from the previous update has exceeded the predetermined period, the CPU 12 notifies the user that it is preferable to execute update of the read correction information 26, the present disclosure is not limited thereto. For example, the CPU 12 may be configured to notify the user, when image read processing has been performed on a predetermined number of sheets of a particular document M, that it is preferable to execute update of the read correction information 26. Also, in the above-described embodiment, the CPU 12 notifies the user, when the period of time from the previous update has exceeded a predetermined period, that it is preferable to execute update of the print correction information 46. However, the present disclosure is not limited thereto. For example, the CPU 12 may be configured so as to notify the user, when print processing has been performed on a predetermined number of sheets of a particular printing medium S, that it is preferable to execute update of the print correction information 46.

Although, in the above-described embodiment, update of the read correction information 26 and the print correction information 46 is notified by providing a display output to the operation panel 15, the present disclosure is not limited thereto. For example, update of the read correction information 26 and the print correction information 46 may be notified by providing a sound output, and also may be notified by providing a print output.

Although, in the above-described embodiment, update of the read correction information 26 is notified, processing for notifying update of the read correction information 26 may be omitted. Even in such a case, using the read correction information 26 which has been set, more appropriate image read processing may be executed. Also, in the above-described embodiment, update of the print correction information 46 is notified. However, update of the print correction information 46 may be omitted. Even in such a case, using the read correction information 26 and the print correction information 46 which have been set, more appropriate print processing may be executed. As another alternative, setting of the print correction information 46 may be omitted. In such a case also, using the read correction information 26, more appropriate image read processing may be executed.

In the above-described embodiment, the print correction information 46 including the print and transport correction value for use in adjusting the transport distance is set for a transport displacement at the printing and transporting roller 58. However, as long as the print correction information for use in correcting a transport displacement in print processing is set, the present disclosure is not limited thereto. For example, print correction information including a print correction value for use in correcting the number of ink discharge steps of the print head 52 may be set. The number of ink discharge steps may be, for example, the number of lines of ink discharged from the print head 52 while the printing medium S is transported for a predetermined distance. That is, if the number of lines of ink discharged while the printing medium S is transported for the predetermined distance is increased, the image has a large length along the transporting direction, and on the other hand, if the number of lines of ink discharged is reduced, an image has a small length along the transporting direction. As a result, a transport displacement may be corrected. Also, in the above-described embodiment, for a transport displacement at the printing and transporting roller 58, processing for adjusting the transport distance is performed. However, processing for adjusting the number of discharge steps of the print head 52 may be performed. Even in such a case, more appropriate image read processing may be executed, and a more appropriate read image may be obtained.

Although, in the above-described embodiment, the print and transport correction pattern 75 is read using the read correction information 26 and print correction information 46 is set, the present disclosure is not limited thereto. The read correction information 26 which has been set may be used when at least one of read processing for the print and transport correction pattern 75 and setting of the print correction information 46 is executed. For example, the print and transport correction pattern 75 may be read without using the read correction information 26, the length of the print and transport correction pattern 75 which has been read may be corrected using the read correction information 26, and the value of the corrected length of the print and transport correction pattern 75 may be set as a read value in the print correction information 46. Even in such a case, taking a transport displacement in the scanner engine 30 into account, more appropriate print correction information 46 may be set.

Although, in the above-described embodiment, the print head 52 is moved in the direction intersecting the forming and transporting direction to form an image, the present disclosure is not limited thereto. For example, an image may be formed by a line head formed in the direction intersecting the forming and transporting direction. Even in such a case, using the read correction information 26 and the print correction information 46, more appropriate print processing may be executed, and a more appropriate print image may be obtained.

Figure 12:
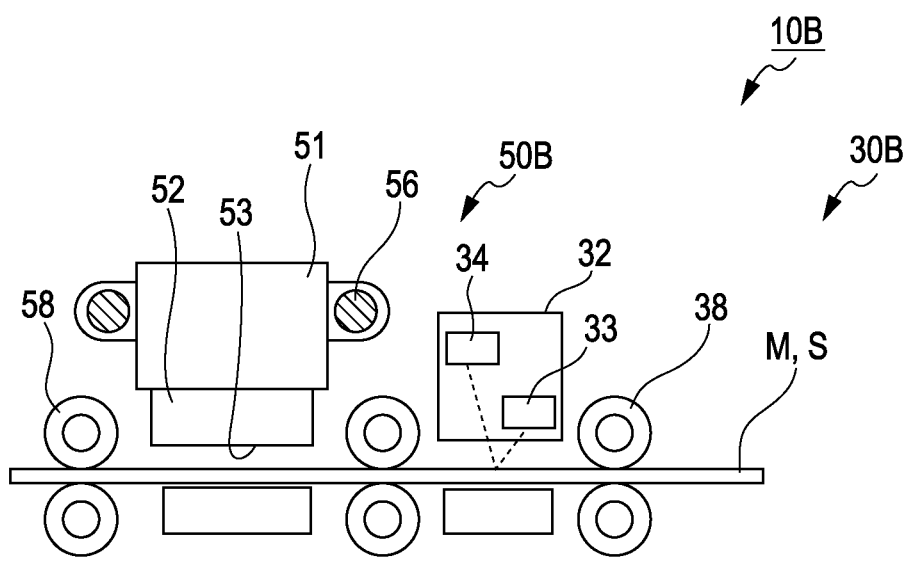
FIG. 12 is a view illustrating a printing and reading system in which a transporting path is shared.

Although, in the above-described embodiment, the scanner unit 20 and the printer unit 40 are configured as separate units, the present disclosure is not limited thereto. As illustrated in FIG. 12, a printing and reading system including a scanner engine 30B and a printer engine 50B that share a transporting path and a transporting roller may be employed. FIG. 12 is a view illustrating a printing and reading system 10B in which a transporting path is shared. Thus, the configuration of a printing and reading system according to an aspect of the present disclosure may be more simplified. In this case, read correction information and print correction information may be formed as common correction information. Furthermore, the print and transport pattern data 45 may be omitted.

Although, in the above-described embodiment, the read correction information 26 is stored in the memory section 23, the present disclosure is not limited thereto. The read correction information 26 may be stored, for example, in a flash memory 13, and also, may be stored in the memory section 43. Also, in the above-described embodiment, the print correction information 46 is stored in the memory section 43. However, the present disclosure is not limited thereto. The print correction information 46 may be stored, for example, in the flash memory 13, and also, may be stored in the memory section 23. Moreover, in the above-described embodiment, the read and transport pattern data 44 and the reference length thereof are stored in the memory section 43, but the present disclosure is not limited thereto. The read and transport pattern data 44 and the reference length thereof may be stored, for example, in the flash memory 13, and also, may be stored in the memory section 23. The read and transport pattern data 44 and the reference length thereof may be separately stored in separate memory sections. Also, in the above-described embodiment, the print and transport pattern data 45 and the reference length thereof are stored in the memory section 43, but the present disclosure is not limited thereto. The print and transport pattern data 45 and the reference length thereof may be stored, for example, in the flash memory 13, and also, may be stored in the memory section 23. The print and transport pattern data 45 and the reference length thereof may be separately stored in separate memory sections.

Although, in the above-described embodiment, in Step S120 of the read correction information setting processing routine, the printing medium S is transported using the print correction information 46 with print and transport correction, the printing medium S may be transported without the print and transport correction. The reason for this is that the read and transport correction pattern 70 is formed in the direction intersecting the forming and transporting direction and thus is rarely influenced by transporting processing in printing. Moreover, in Step S150, the document M is transported without read and transport correction using the read correction information 26, but the present disclosure is not limited thereto. For example, if the read correction information 26 is already registered, the document M may be transported with read and transport correction using the read correction information 26. In this case, the read and transport correction value may be updated with an appropriate read and transport correction value which has been set taking the read and transport correction value before updating into an account, on the basis of a result of reading the read and transport correction pattern 70.

Although, in the above-described embodiment, in Step S420 of the print correction information setting processing routine, the printing medium S is transported without print and transport correction using the print correction information 46, the printing medium S may be transported with the print and transport correction. In this case, the print and transport correction value may be updated with an appropriate print and transport correction value which has been set taking the print and transport correction value before updating into an account, on the basis of a result of reading the print and transport correction pattern 75.

In the above-described embodiment, the read correction information 26 has been already set for the printing medium S for which the print correction information 46 is to be set. However, for example, after the type of the printing medium S is inputted in Step S400, whether or not there is a corresponding read and transport correction value of the document M may be determined and, if there is no corresponding read and transport correction value of the document M, notification to encourage setting of the read and transport correction value may be issued to the user.

Although, in the above-described embodiment, the printing and reading system 10 configured as a multi-function printer including the scanner unit 20 and the printer unit 40 has been described, the present disclosure is not limited thereto. For example, a scanner unit configured not to include the printer unit 40 may be employed, and also, a fax machine having a fax function may be employed. Also, in the above-described embodiment, the printer unit 40 is an ink-jet type color printer mechanism, but the present disclosure is not limited thereto. The printer unit 40 may be an electrophotographic color printer, may be a dot impact type color printer, and may be a monochrome printer.

In the above-described embodiment, the printing and reading system 10 has been described. However, as an aspect of the present disclosure, a method for controlling the scanner unit 20 may be adopted, and also, a program that executes the method may be adopted. Also, according to an aspect of the present disclosure, a method for controlling the printing and reading system 10 may be adopted, and also, a program that executes the method may be adopted.

The entire disclosure of Japanese Patent Application No. 2012-013102, filed Jan. 25, 2012 is expressly incorporated by reference herein.

What is claimed is:

1. An image reading apparatus that uses an image formed by an image forming apparatus including an image forming section that forms an image on a medium and a medium transporting section that transports the medium relative to the image forming section in a predetermined forming and transporting direction comprising:
   a reading section that reads a document;
   a document transporting section that transports the document relative to the reading section in a predetermined reading and transporting direction;
   a read correction pattern forming section that forms a read correction pattern that extends in a scanning direction that intersects the reading and transporting direction; and
   a correction control section that, with a medium on which the read correction pattern is formed, causes the document transporting section to transport the medium with the read correction pattern extending along the forming and transporting direction and causes the reading section to read the medium, and sets read correction information for use in correcting a reading condition regarding image read processing of at least one of the reading section and the document transporting section on the basis of a result of the reading.

2. The image reading apparatus according to claim 1, wherein the correction control section causes execution of the image read processing for a document of a type corresponding to the read correction information using the read correction information which has been set.

3. The image reading apparatus according to claim 1, wherein the correction control section sets the read correction information for use in correcting at least one of a transport distance of the document transporting section and a reading step of the reading section on the basis of the ratio of the length of a pattern contained in the read correction pattern which has been read to a reference length of the read correction pattern which has been stored in advance.

4. The image reading apparatus according to claim 1, wherein the correction control section sets the read correction information in which a correction value of the reading condition is associated with each type of document.

5. The image reading apparatus according to claim 1, wherein the read correction pattern is formed so as to have a length greater than at least a circumference of a document transporting roller included in the document transporting section.

6. The image reading apparatus according to claim 1 further comprising:
a notifying section that issues a notice to prompt reading of the read correction pattern at a predetermined timing.

7. The image reading apparatus according to claim 6, wherein in the case where a read instruction for the document is given, if a period of time from a previous reading of a document of the selected type has exceeded a predetermined time, the notifying section issues a notice to prompt reading of the read correction pattern such that the time when the read instruction is given is the predetermined timing.

8. An image forming and reading system comprising:
the image reading apparatus according to claim 1; and
an image forming apparatus including an image forming section that forms an image on a medium, a medium transporting section that transports the medium relative to the image forming section in a predetermined forming and transporting direction, and an image forming control section that controls the image forming section and the medium transporting section to cause an image to be formed on the medium,
wherein the image forming control section of the image forming apparatus causes the read correction pattern to be formed on the medium in the direction intersecting the forming and transporting direction, and
the correction control section of the image reading apparatus causes the read correction pattern formed by the image forming apparatus to be read.

9. An image forming and reading system comprising:
the image reading apparatus according to claim 2; and
an image forming apparatus including an image forming section that forms an image on a medium, a medium transporting section that transports the medium relative to the image forming section in a predetermined forming and transporting direction, and an image forming control section that controls the image forming section and the medium transporting section to cause an image to be formed on the medium,
wherein the image forming control section of the image forming apparatus causes the read correction pattern to be formed on the medium in the direction intersecting the forming and transporting direction, and
the correction control section of the image reading apparatus causes the read correction pattern formed by the image forming apparatus to be read.

10. An image forming and reading system comprising:
an image reading apparatus according to claim 3; and
an image forming apparatus including an image forming section that forms an image on a medium, a medium transporting section that transports the medium relative to the image forming section in a predetermined forming and transporting direction, and an image forming control section that controls the image forming section and the medium transporting section to cause an image to be formed on the medium,
wherein the image forming control section of the image forming apparatus causes the read correction pattern to be formed on the medium in the direction intersecting the forming and transporting direction, and
the correction control section of the image reading apparatus causes the read correction pattern formed by the image forming apparatus to be read.

11. The image forming and reading system according to claim 8,
wherein the image forming control section causes the medium transporting section to transport the medium and the image forming section to form an image formation correction pattern on the medium in the forming and transporting direction, and
the correction control section causes the document transporting section to transport the medium on which the image formation correction pattern is formed by the image forming apparatus such that the forming and transporting direction extends along the reading and transporting direction and causes the reading section to read the image formation correction pattern, sets formation correction information for use in correcting an image formation condition regarding image formation processing of at least one of the image forming section and the medium transporting section on the basis of a result of the reading, and uses the read correction information which has been set when executing read processing for the image formation correction pattern or setting of the formation correction information.

12. The image forming and reading system according to claim 11,
wherein the correction control section sets the formation correction information for use in correcting at least one of a transport distance of the medium transporting section and an image formation step of the image forming section on the basis of the ratio of a length of a pattern included in the image formation correction pattern which has been read to a reference length of the image formation correction pattern which has been stored in advance.

13. The image forming and reading system according to claim 11,
wherein the correction control section sets the formation correction information in which a correction value of the image formation condition is associated with each type of medium.

14. The image forming and reading system according to claim 11,
wherein the image formation correction pattern is formed so as to have a length greater than at least a circumference of a medium transporting roller included in the medium transporting section.

15. The image forming and reading system according to claim 8,
wherein the image forming section forms an image by moving an image forming head in the direction intersecting the forming and transporting direction.

16. The image forming and reading system according to claim 8,
  wherein the document transporting section of the image reading apparatus and the medium transporting section of the image forming apparatus are configured so as to be shared by the image reading apparatus and the image scanning forming apparatus.

17. A method for controlling an image reading apparatus which is executed by a computer, the image reading apparatus being configured to use an image formed by an image forming apparatus including an image forming section that forms an image on a medium and a medium transporting section that transports the medium relative to the image forming section in a predetermined forming and transporting direction, including a reading section that reads a document and a document transporting section that transports the document relative to the reading section in a predetermined reading and transporting direction, the method comprising:
  forming a read correction pattern that extends in a scanning direction that intersects the reading and transporting direction;
  causing, with a medium on which the read correction pattern is formed by the image forming apparatus, the document transporting section to transport the medium with the read correction pattern extending along the direction intersecting the forming and transporting direction and causing the reading section to read the medium; and
  setting read correction information for use in correcting a reading condition regarding image read processing of at least one of the reading section and the document transporting section on the basis of a result of the reading of the medium.

18. A non-transitory computer medium encoded with a computer program for causing one or more computers to execute each step of the method for controlling the image reading apparatus according to claim 17.

19. A method for controlling an image forming and reading system which is executed by a computer, the image forming and reading system including an image forming apparatus having an image forming section that forms an image on a medium and a medium transporting section that transports the medium relative to the image forming section in a predetermined forming and transporting direction, and an image reading apparatus having a reading section that reads a document and a document transporting section that transports the document relative to the reading section in a predetermined reading and transporting direction, the method comprising:
  forming a read correction pattern that extends in a scanning direction that intersects the reading and transporting direction;
  causing, with a medium on which the read correction pattern being formed, the document transporting section to transport the medium with the read correction pattern extending along the forming and transporting direction and causing the reading section to read the medium;
  setting read correction information for use in correcting a reading condition regarding image read processing of at least one of the reading section and the document transporting section on the basis of a result of the reading of the medium;
  causing the medium transporting section to transport the medium and the image forming section to form an image formation correction pattern on the medium in the forming and transporting direction;
  causing the document transporting section to transport the medium on which the image formation correction pattern is formed and causing the reading section to read the image formation correction pattern; and
  setting formation correction information for use in correcting an image formation condition regarding image formation processing of at least one of the image forming section and the document transporting section on the basis of a result of the reading of the image formation correction pattern to control at least one of the reading section and the document transporting section using the read correction information which has been set in setting the read correction information, thereby executing the image read processing.

20. A non-transitory computer medium encoded with a computer program for causing one or more computers to execute each step of the method for controlling the image forming and reading system according to claim 19.

* * * * *